United States Patent [19]
Powell et al.

[11] 4,001,772
[45] Jan. 4, 1977

[54] CODED SIGNALING AND CONTROL SYSTEM

[75] Inventors: Truman W. Powell, Zephyrhills, Fla.; Jordan R. Davis, Lula, Ga.

[73] Assignee: Truman W. Powell, Zephyrhills, Fla.

[22] Filed: July 30, 1975

[21] Appl. No.: 600,408

[52] U.S. Cl. .................. 340/171 PF; 340/311; 325/64
[51] Int. Cl.² .................................... H04Q 9/12
[58] Field of Search ............. 340/164, 167, 171 R, 340/171 PF, 171 A, 224, 311; 325/64

[56] References Cited
UNITED STATES PATENTS

| | | | |
|---|---|---|---|
| 3,175,191 | 3/1965 | Cohn et al. | 340/164 R |
| 3,530,434 | 9/1970 | Stites et al. | 340/171 PF |
| 3,737,857 | 6/1973 | Carman | 340/171 PF |
| 3,745,530 | 7/1973 | Carman | 340/164 R |
| 3,766,523 | 10/1973 | Brocker et al. | 340/171 PF |
| 3,801,742 | 4/1974 | O'Brien et al. | 340/171 PF |
| 3,860,913 | 1/1975 | Weeks, Jr. et al. | 340/171 PF |
| 3,866,124 | 2/1975 | Wycoff | 340/171 PF |
| 3,882,466 | 5/1975 | Poorvin et al. | 340/171 R |

*Primary Examiner*—Donald J. Yusko
*Attorney, Agent, or Firm*—Imirie, Smiley & Linn

[57] ABSTRACT

A coded signaling and control system including one or more transmitters and one or more receivers, wherein both the transmitters and the receivers are coded or programmed to transmit a unique signal for actuating only selected ones of the receivers. Digital logic and switching circuits are used to generate a transmission sequence containing an initial reset burst followed by alternate shift and code bit signals terminating with a comparison and latching signal. All of the receivers in the system receive the initial reset signal and the alternate shift and data bit sequence; however, only the selected receiver programmed for the precise code being transmitted will generate a true comparison signal. Thereafter, all of the other receivers will be reset and the desired receiver will be sequenced to respond to an "off" or "on" latching signal for providing any desired output function, such as operating an alarm, controlling an associated piece of equipment, and the like. Using an eight bit word in the coded message, 255 discrete codes may be used such that triggering of other than the single preselected receiver is precluded. In addition, by varying the tone frequencies used in the code bit generator, many thousands of additional discrete coded combinations can be provided.

8 Claims, 6 Drawing Figures

CODED SIGNALING AND CONTROL SYSTEM

BACKGROUND OF THE INVENTION

1. Field of the Invention

The present invention relates generally to signaling system and, more particularly, to selective signaling systems wherein one or more coded transmitters communicate with one or more receivers and cause actuation of only that receiver programmed to the transmitted code.

2. Description of the Prior Art

Remote control and signaling systems of various types have been available for quite some time. Examples of prior art systems can be found from the simplest remote control garage door openers to the most sophisticated enviromental control systems used for multiple building complexes to regulate everything from lighting to burglar alarms, fire detection systems, heating and colling systems, and telephone answering apparatus. Examples of remote control can also be found in the industrial environment where centralized control of many manufacturing and processing facilities and steps are today being provided in order to reduce manpower needs and high labor costs.

The conventionally available remote control signaling sytems have generally proven to be satisfactory for their intended purposes; however, they often exhibit a number of serious disadvantages and limitations which sometimes render the system totally unacceptable. For example, many medical applications for remote control and monitoring systems must meet stringent reliability and accuracy standards in order to protect the lives of the patients involved. Improper control or false triggering in such a system could have the gravest of consequences and thus cannot be tolerated.

Many prior art systems attempt to provide selectivity and prevent false triggering by tuning the receiver section to respond to incoming signals of only a single frequency. Second generation versions of this type of system may provide for discrimination of a multi-frequency signal; however, the provision of more than two or three descrete frequencies results in the system having considerable complexity and added costs. Naturally, the more complex the system, the greater its isolation from spurious signals. However, as one continues to make the system more complex, a point is reached where the economic disadvantages outweigh the advantages of increased selectivity. Unfortunately, this tradeoff has in the past been typically at a point below that which precludes all likely false responses, and many signaling systems have been found unsatisfactory for this reason.

Another serious drawback prevalent in prior art devices of this general type is their lack of flexibility and adaptability to different remote control and signaling situations. In that case, each individual remote control system has to be custom designed or modified to meet the requirements of the overall system to which it is adapted. If each major installation requires design modification by professional engineers, cost again become prohibitive. Furthermore, limited general applicability prevents these systems from being extensively advertised which has limited their widespread acceptance by the general public.

While the need for error-free, selective, remote control and signaling has been long recognized, there has heretofore been unavailable any system having substantial flexibility, considerable immunity to false triggering, adaptability to small, integrated circuit construction, and low initial costs and maintenace.

SUMMARY OF THE INVENTION

The present invention may be summarized in that a selective signaling and control system includes a first network for generating a start and reset signal, a second network for alternately transmitting a shift and code bit signal, and a third network for transmitting a latch control signal; and furthr including a receiving assembly having a first circuit responsive to the first signal for assuming a data receive mode, a second circuit responsive to the alternate shift and data bit signals to store a transmitted code word, means comparing said code with a preselected code word and generating an output signal when the two code words are equal, and a network enabled by the output of the comparator to respond to said latch control signal for activating an output device.

It is an object of the present invention to transmit a coded signal for reception be only that receiver programmed for the transmitted code.

Another object of this invention is to construct an integrated circuit signaling system for remote control of selected functions or devices and having high noise and spurious signal immunity.

It is a further object of this invention to construct a coded signaling system in which the code word is an eight bit binary signal, each "true" bit being constructed of one of five discrete tone bursts.

The present invention is advantageous over prior art systems of this general type in the provision of high immunity from undesired signals and random noises, adaptability for integrated circuit construction, simplicity of design with resultant cost savings, flexibility and adaptability to any desired installation, and low maintenance and operating costs.

Other objects and advantages of the present invention will become apparent from the following description of a preferred embodiment when taken in conjunction with the accompanying drawings.

DESCRIPTION OF THE PREFERRED EMBODIMENT

The present invention may be used for any number of purposes. For example, it may be used for remotely turning on and off a burglar alarm and security system surrounding a private residence or any other building or area. In that case, both the transmitter and receiver sections are pre-programmed for a particular eight bit binary word. Upon transmission of the coded word and a subsequent ON command, the receiver will respond by turning on the system so as to secure the premises against intrusion from unauthorized personnel. Thereafter, only those persons having transmitters programmed with the selected code will be able to transmit a subsequent OFF command to deactivate the system. Because of the nature of the coded signal and the transmission sequence, to be described more fully below, unauthorized transmission of signals or the attempted simulation of the selected transmission sequence is virtually impossible.

In the above described exemplary application of the control system of the present invention, a single receiver associated with the burglar alarm and intrusion prevention assembly is all that is required. Any number of transmitters can be used, and would be distributed to those persons authorized to activate and deactivate the system and enter the premises. In a slightly more complex versions of this application, any number of separate areas within a factory, for example, may be secured by using individual intrusion prevention assemblies. Each of these areas and assemblies would have associated therewith a single receiver programmed to one of a plurality of different eight bit binary code words. In that case, transmitters would be distributed to all persons authorized to enter any of the protected areas, however, each individual's transmitter would be programmed with one or more codes corresponding to the one or more areas for which he is authorized only.

Figure 1:
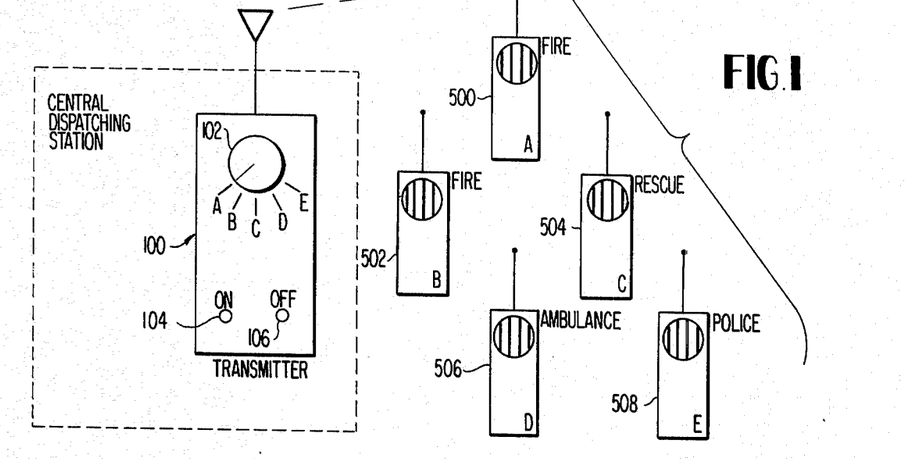
FIG. 1 is a block diagram of a preferred embodiment of a coded signaling and control system according to the present invention.

In both of the above described applications, plural transmitters are associated with a single receiver. More applications do exist, however, where only a single transmitter would be provided for controlling any number of remote receivers. As shown in FIG. 1, a single transmitter 100 is provided and may be located for example, at a central dispatching station for volunteer fire, rescue, ambulance and police units. If the fire company is organized in two different battalions, each of the battalions might have an individual eight bit code assigned permanently to it. Likewise, the rescue squad, ambulance service, and police units would have their own codes, and the respective codes are designated in FIG. 1 as codes A through E. Each member of battalion A of the volunteer fire department would be provided with an individual, portable receiver 500 programmed to respond to code A, and each member of battalion B would have a receiver 502 programmed to code B signals. Rescue, ambulance and police personnel likewise would be equipped with receivers 504, 506 and 508, respectively, responsive to code C, D and E signals.

In the event of an emergency, personnel at the central dispatching station assess of the nature of the call and then activate transmitter 100 so as to send out only those coded signals corresponding to the volunteer members required. FOr example, if a small fire was reported which could properly be handled by members of battalion A, transmitter 100 would be programmed by adjusting control 102 to the code A signal. Then, ON switch 104 would be actuated so as to initiate the transmitter sequence. The transmitter 100 then sends out a signal conditioning all of the receivers 500 through 508 for the reception of an incoming word. The code word is then transmitted to all of the receivers, and the receivers are sequenced to compare the received code word with the pre-programmed word to which they have been adjusted. Since only receivers 500 are programmed to receive the code A word, all of the other receivers 502 through 508 will show a false comparison causing automatic resetting to their initial standby mode.

Since receiver 500 has provided a true comparison between the pre-programmed code and the received code from transmitter 100, an enabling signal will be provided so that the incoming alarm can be registered. Since ON switch 104 of transmitter 100 was actuated to initiate the transmission sequence, an on latching signal will be provided to receiver 500 causing the same to register an alarm and remain latched in this alarm condition. Thus, all of the battalion A receivers will register an alarm condition so that the battalion A personnel can promptly respond to the fire. Since receivers 500 are self-latching, they will remain in an alarm state until the subsequent code sequence is transmitted from the dispatching station. In this manner, the receivers in the possession of each of the firemen need not be continuously monitored and can be merely periodically reviewed. Any incoming alarm call will register the alarm signal and will remain in such actuated or alarm state until the receiver is reset or the OFF command signal is transmitted from the dispatching station.

In the event that an alarm signal is transmitted and it is shortly thereafter discovered that the emergency is either false or has already been satisfied, an OFF signal can be transmitted to each of the code A receivers in the same manner as the original alarm signal. By actuating OFF switch 106, the transmitter 100 will provide the initial resetting signal and the subsequent data cycle as well as an OFF signal causing the receiver to be latched back to its standby mode once again.

It should be understood, of course, that the foregoing discussion is merely exemplary of one illustrative application of the coded signaling and control system of the present invention. Any number of diverse applications are possible using radio communication as well as direct wiring, leased telephone lines, microwave communications, etc. Further, audio one-way or two-way channels can be provided and can be opened or enabled by transmission of the preselected code for a private communication system. The number of code transmitters used and/or receivers used in the system is also by no means limited, and code combinations in excess of 15,000 for each carrier frequency provided the system with the capability of fulfilling an endless number of use requirements.

Figure 2:
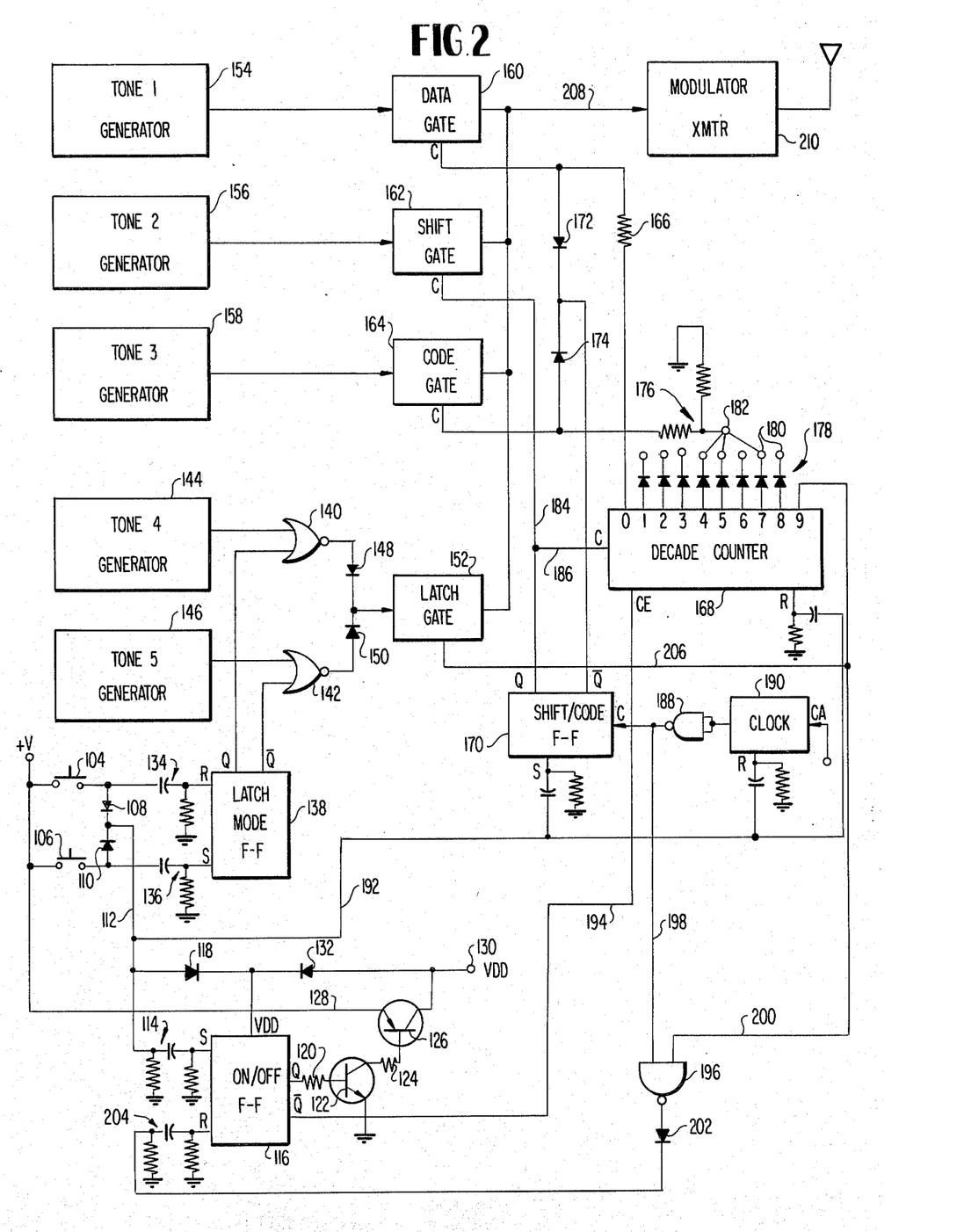
FIG. 2 is a schematic diagram, partly in block form, of the transmitter of the system of FIG.1.

Referring now to FIG. 2, the transmitter 100 of the present invention includes a pair of normally open switches 104 and 106 which respectively initiate ON and OFF transmission sequences. Both switches are connected between a source of operating potential, represented by terminal +V, and the anodes of diodes 108 and 110, respectively. The cathodes of both diodes are connected together and are coupled by line 112 and network 114 to the set input S of on/off flip-flop 116. Line 112 is also connected to the VDD input of flip-flop 116 via diode 118 such that when either switch 104 or 106 is depressed, operating potential is fed through a respective one of the diodes 108 and 110 to both the S input and the VDD input of flip-flop 116. The flip-flop thus assumes a set condition when either switch is actuated, causing a true or "1" signal to appear on flip-flop output Q.

Output terminal Q of flip-flop 116 is coupled by a resistor 120 to the base electrode of a transmitter 122. The emitter electrode of transistor 122 is grounded while the collector electrode thereof is coupled by a resistor 124 to the base of a second transistor 126. The emitter electrode of transistor 126 is connected by line 128 to potential source +V, while the collector electrode of the transistor is connected to an output terminal 130 as well as to the VDD input of flip-flop 116 by diode 132. Output terminal 130 supplied operating potential to all of the remaining circuit components of the transmitter.

In this manner, when either switch 104 or 106 is actuated to start a transmission sequence, on/off flip-flop 116 will be placed in a set mode, thereby turning on transistor 122 and, in turn, turning on transistor 126 to supply operating potential from source +V to terminal 130. The potential on terminal 130 is coupled back through diode 132 so as to maintain the flip-flop energized after switch 104 or switch 106 is released.

It should be understood, of course, that while all devices in the system are supplied with operating potential from terminal 130, the individual interconnections are familiar to those of ordinary skill in the art and are thereby not described in detail for the sake of brevity.

Switches 104 and 106 are also connected via suitable coupling networks 134 and 136 to the reset and set inputs, respectively, of a latch mode flip-flop 138. Latch mode flip-flop 138 is thereby placed in either a reset or a set condition depending on which one of the switches 104 and 106 are initially actuated. The Q and $\overline{Q}$ outputs of latch mode flip-flop 138 are each connected to a first input of a pair of logic gates 140 and 142, respectively. The second inputs of each of the logic gates 140 and 142 are connected to receive output signals from tone generators 144 and 146, respectively, to be described more fully below. The output terminals of gates 140 and 142 are connected to the anodes of diodes 148 and 150, respectively, whose cathodes are connected together and fed to the input of latch gate 152.

The foregoing circuitry preconditions the mode of each transmission sequence. For example, if an ON transmission sequence is desired, switch 104 will be actuated to apply a reset input to latch mode flip-flop 138. With the latch mode flip-flop in a reset condition, its $\overline{Q}$ output will be true or 1 while its Q output will be false or "0". The output signal from tone generator 146 will therefore be blocked by gate 142 while the output of tone generator 144 will pass through gate 140 and diode 148 to the input of latch gate 152. Similarly, if switch 106 is actuated to initiate an OFF transmission sequence, the latch mode flip-flop 138 will be set so that the $\overline{Q}$ output will be false and the Q output will be true. This blocks the output of tone generator 144 and passes the output of generator 146 through gate 142 and diode 150 to the input of latch gate 152.

Thus, actuation of switches 104 and 106 turns on the on/off flip-flop 116 and causes the application of the output of tone generator 144 or tone generator 146, respectively, to the input of latch gate 152. As will be more fully described below, a transmission sequence will then commence and will continue regardless of whether the actuated switch is held closed or released.

Three additional tone generators 154, 156 and 158 are also provided and have their outputs connected to the input terminals of a data gate 160, a shift gate 162, and a code gate 164. Gates 160, 162 and 164, function identically to that of latch gate 152 and transfer the signals appearing on their respective input terminals to their output terminals only when a true or 1 signal appears on control input C. The control input of gate 160 is connected through a resistor 166 to the 0 output of a decade counter 168 and is also connected to the $\overline{Q}$ outputs of a shift/code flip-flop 170 by a diode 172. A similarly connected diode 174 couples the $\overline{Q}$ output of shift/code flip-flop 170 to the control input of code gate 164 which, in addition receives an input signal through resistor network 176 from the 1 to 8 output patching circuit of the decade counter 168.

As will be more fully described below, the 1 to 8 outputs of decade counter 168 are each coupled through isolation diodes 178 to a set of terminal 180. Resistor 176 is likewise connected to a common terminal 182, and any one or more of the terminals 180 may be interconnected with terminal 182 to determine the position of the true or 1 bits in the eight bit binary code word. In the example illustrated in FIG. 2, for instance, it can be appreciated that bits 1, 2, 3, 6 and 8 are false or 0 bits while bits 4, 5, and 7 are true or 1 bits forming the particular code word "00011010".

The control input of shift gate 162 receives an input signal on line 184 from the Q output of shift/code of flip-flop 170. A branched lead 186 also connects the output signals from the Q output of shift/code flip-flop 170 from line 184 to the shift or clock input C of decade counter 168.

Shift/code flip-flop 170 acts as a toggle or T flip-flop and has its clock input connected through an inverter 188 to the output of a clock network 190. Clock network 190 may take any suitable form but is preferably a 50 or 60 divider, receiving an input on terminal CA from the output of any selected one of the tone generators 154, 156, 158, 144 and 146. While any generator can be used, the lowest frequency tone is preferred. As will become clear from a discussion of the operation of the system, if generator 154, for example, is selected as the input to clock 190, each 50 to 60 cycles of the generator will produce a single output to be fed to the shift/code flip-flop 170. Thus, 50 cycles of the tone generator define one cycle or frame within a transmission sequence.

A lead 192 is connected from line 112 through suitable coupling networks to the set input of shift/code flip-flop 170, the reset input of clock network 190, and the reset input of decade counter 168. In this manner, actuation of either switches 104 or 106 to start a transmission sequence will cause the shift/code flip-flop 170 to assume its set while clock 190 and decade counter 168 are reset. Decade counter 168 also has its clock enable input CE coupled over line 194 to the $\overline{Q}$ output of on/off flip-flop 116 to enable the count sequence only when flip-flop 116 is in a set state.

A logic gate 196 has one input connected to the inverted output of clock 190 via line 198, and a second input connected by lead 200 to the "9" output of decade counter 168. The output signal of gate 196 is fed through diode 202 and coupling network 204 to the reset network of on/off flip-flop 116 to turn off the transmitter and place it in a standby mode at the end of each transmission sequence. The 9 output of decade counter 168 is also connected by a line 206 to the control input of latch gate 152 for passing the output of enabled generator 144 or 146 through for transmission when the 9 output is true or high.

The output terminals of gates 160, 162, 164 and 152 are all connected over line 208 to the input of a modulator and transmitter 210. In the example previously described with respect to FIG. 1, it was envisioned that the output signals on line 208 would be modulated on a carrier frequency and transmitted by radio wave to the various receivers in the system. It should be understood, of course, that modulated carrier wave communication is not necessary and any appropriate data or communication link between the transmitters and receivers in the system may be used.

Figure 3:
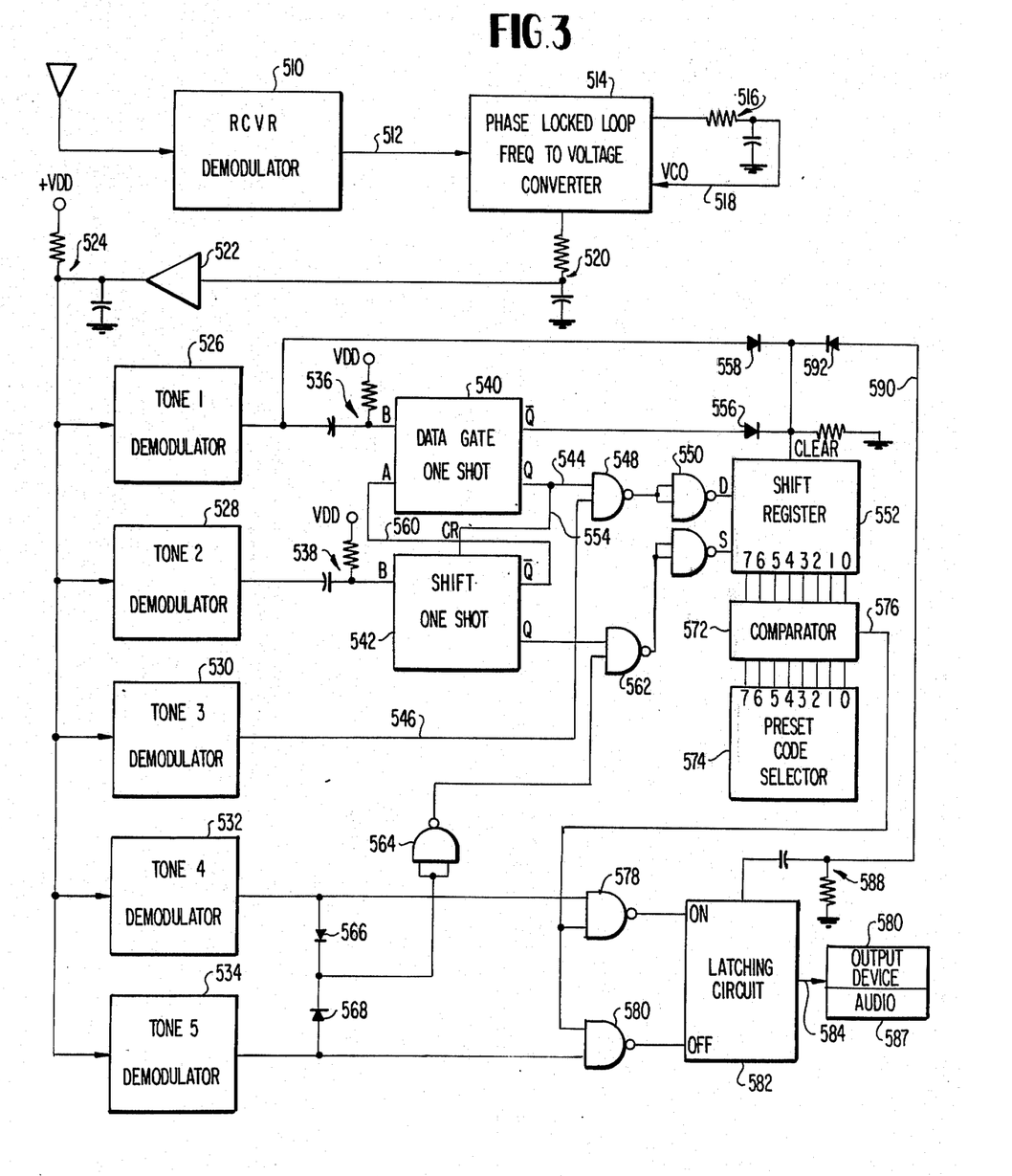
FIG. 3 is a schematic diagram, partly in block form, of the receiver of the system of FIG. 1.

Turning now to FIG. 3, which illustrates a receiver compatible with the transmitter of FIG. 2, a carrier wave receiver and demodulator network 510 is provided for receiving the radio signals from the transmitter and extracting the data information therefrom. The output of the receiver and demodulator 510 is applied over line 512 to the input of a phase locked loop frequency-to-voltage converter 514. An output of the converter 514 is applied through a low pass filter 516 to remove voltage spikes from the phase comparator signal. The signal from low pass filter 516 is in turn applied over line 518 to the VCO input of the device. The source follower output of the converter is fed through an additional filtering and coupling network 520 to the input of a voltage follower 522. The output of the voltage follower is then applied to a circuit 524 which receives operating potential from source +VDD. The source follower output from circuit 524 is fed to each of the input terminals of five different tone demodulators 526, 528, 530, 532 and 534 whose designated tones are related to those of tone generators 154, 156, 158, 144 and 146, respectively, and are identified as tones 1–5.

The output signals of demodulators 526 and 528 are coupled through networks 536 and 538 to the "B" or negative going input of a data gate one-shot multivibrator 540 and a shift one-shot multivibrator 542, respectively. The timing of the two one-shots is such that the data gate 540 times out after approximately four periods within each transmission sequence while the shift one-shot times out after approximately one and one-half periods.

The Q output of data gate one-shot 540 as well as the outut of tone demodulator 530 are coupled via lines 544 and 546, respectively, to the inputs of a data gate 548 having its output inverted by inverter 550 and applied to the data input of a shift register 552. The Q output of data gate one-shot 540 is also fed over line 554 to the reset input CR of shift one-shot 542. The $\overline{Q}$ output of data gate one-shot 540 and the output of tone demodulator 526 are connected through isolation diodes 556 and 558, respectively, to the clear input of shift register 552.

The $\overline{Q}$ output of shift one-shot 542 is connected over line 560 back to the positive going to "A" input of data gate one-shot 540, while the Q output of one-shot 542 is connected to one input of a two input gate 562. The second input signal to gate 562 is supplied through an inverter 564 from the common connection of the cathodes of two isolation diodes 566 and 568. The anodes of diodes of 566 and 568 are respectively connected to the outputs of tone demodulators 532 and 534, respectively. The output of gate 562 is inverted by inverter 570 and applied to the clock or shift input of shift register 552.

The 8 bit binary output of shift register 552 is coupled to a comparator network 572 which has a second set of input connected to the output of a preset code selector 574. The preset code selector 574 can be adjusted or programmed to provide any desired 8 bit binary output to the comparator 572. Only when the output of shift register 552 is identical to the preset output of cded selector 574 will the comparator 572 register a true or 1 output signal on output line 576.

Line 576 is connected to one input of two identical gates 578 and 580 which have a second input connected respectively to the outputs of demodulators 532 and 534. The output signals from gates 578 and 580 are in turn respectively fed to the on and off inputs of a latching circuit 582. Latching circuit 582 may be of any suitable construction and may include, for example, an SCR, a triac latching circuit, a latching power transistor circuit, a latching relay circuit, or any appropriate circuit which is responsive to the input signals to assume one of two states and to remain latched in that state until receiving a subsequent input. The output of latching circuit 582 is connected over line 584 to an output device 586 which may be take any number of forms depending upon the ultimate application of the system. In the case of a fire-police-rescue system as exemplified by the diagrammatic illustration of FIG. 1, output device 586 may take the form of an audible alarm and/or a warning lamp. Device 586 may also include an audio communication network 587 of any suitable type such as that shown in U.S. Pat. No. 3,358,235. Preferably, the audio network 587 is designated to normally assume a quiescent state and may be placed in an active state in response to the output signal of the latching circuit 582 for the receipt or dispatch of audio information, for the automatic recording of an incoming message, or for the automatic playback of a prerecorded or stored message.

Latching circuit 582 cooperates with the particular output device 586 so that the output device will remain actuated by the latching circuit after the latching circuit has received an on signal from gate 578. Only after a subsequent signal is generated and applied through gate 580 to the off input of latching circuit 582 will the latching circuit release the output device 586 to return to a quiescent or standby state. Latching citrcuit 582 also provides an output signal which is fed by coupling network 588 and line 590 to an isolation diode 592 connected to the clear or reset input of shift register 552.

In the circuit diagram of FIG. 3, as in FIG. 2, none of the conventional wiring connections to supply required operating potential are illustrated. It is to be understood, of course, that appropriate power requirements may be satisified in any well known manner in order to assure proper operation of the system.

Figure 4:
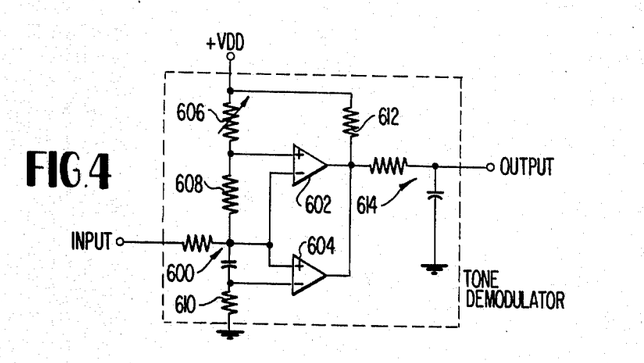
FIG. 4 is a schematic diagram of a tone demodulator of the receiver of FIG. 3.

Referring to FIG. 4, each of the tone demodulators 526–534 of the receiver of FIG. 3 may be identical in construction and may take the form of a "window" type voltage comparator. In such a circuit, the input is fed through a filtering network 600 to the negative input of a differential amplifier 602 as well as to the positive input of a second differential amplifier 604. A voltage divider network including a variable resistor 606, and fixed resistors 608 and 610 is connected in series between the source of operating potential +VDD and ground. The junction point between resistors 606 and 608 is connected to the positive input terminal of amplifier 602, while the junction of resistors 608 and 610 is likewise connected to the negative input of amplifier 604. A resistor 612 is connected between source+VDD and the output terminals of both amplifiers 602 and 604 which are, in turn, fed through RC network 614 to the device output.

The ratio of resistors 606, 608 and 610 determine the range of voltages over which the comparator will be on, i.e., when its output is at a high or 1 level. Furthermore, any of these resistors, in addition to or in lieu of resistor 606, may be made adjustable for convenience. The input network 600 adds additional filtering to the system while resistor 612 and network 614 are selected so that the capacitor in network 614 will charge slowly, to prevent the output from going high as the phase locked loop 514 of the receiver "slews" through a frequency range for which the comparator is set, and will discharge quickly at the end of a detection period. In other words, resistor 612 will be large in comparison with the resistor in network 614. In addition, resistors 606 and 610 determine the voltage level corresponding to the frequency to be detected, and resistor 608 determined the band pass or voltage range corresponding to the frquency range to be "demodulated".

Figure 5:
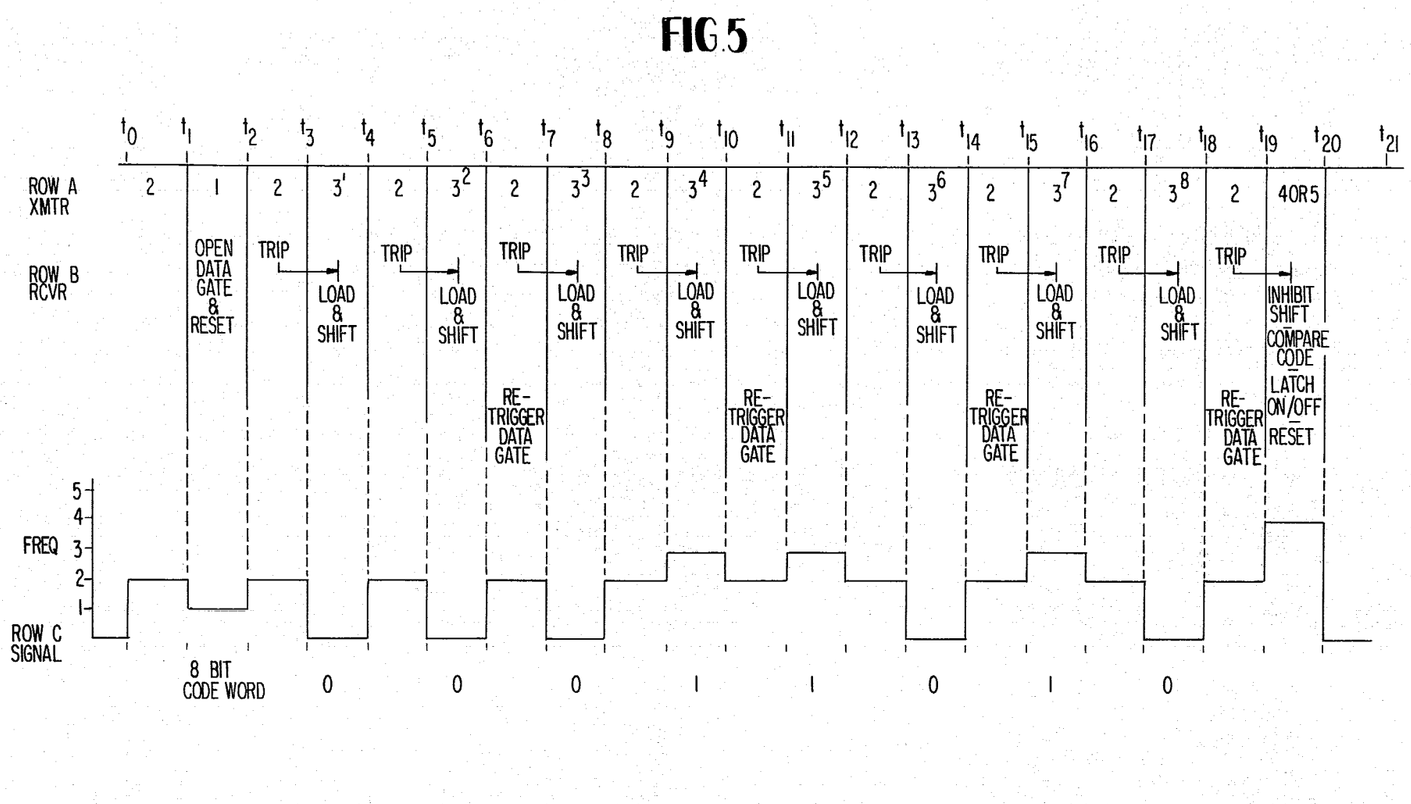
FIG. 5 is a timing chart illustrative of the sequence within a transmission cycle of the sytem of FIG. 1.

In discussing the operation of the control system according to the present invention, reference will be made to the chart of FIG. 5 which diagrammatically illustrate the sequence of events occuring within both the transmitter and the receiver sections. In FIG. 5, time $t_0$ indicates the start of a transmission sequence and time $t_{20}$ indicates completion of an entire coded message.

Referring to FIG. 2, to initiate a transmission sequence for latching the output device 586 of the preprogrammed receiver to an ON condition, switch 104 is depressed thereby applying a positive signal through diode 108, line 112 and network 114 to the set of on/-off flip-flop 116. A positive signal is thereby provided at the Q output of on/off flip-flop 116 causing transistor 122 to turn on. This in turn causes transistor 126 to turn on thereby applying operating potential from source +V over line 128 to the terminal 130. From this point, operating potential is applied to all of the other devices within the transmitter, and the system is placed in an active state.

At the same time the signal on line 112 is coupled by line 192 to the set of shift/code flip-flop 170, the reset input of clock 190, and the reset input of decade counter 168. When the decade counter 168 is reset, its 0 output will have a high or 1 level while all of the remaining outputs 1 through 9 will have allow or 0 output. With the on/off flip-flop 116 latched in a set condition, its $\overline{Q}$ output remains low such that a 0 is coupled over line 194 to the clock enable input of the decade counter 168. A low or 0 signal is required on the clock enable input in order for the decade counter to subsequently to accept data input pulses into its clock input.

At the same time, closing of switch 104 applied a reset signal through network 134 to the reset input of latch mode flip-flop 138. This causes the $\overline{Q}$ output to go to a high or 1 level while the Q output goes to a low or 0 level. This in turn causes gate 142 to be turned off and gate 140 to be turned on so as to pass the output of tone generator 144 via diode 148 to the input of latch gate 152.

Latch gate 152 as well as gates 160, 162 and 164, have identical operating characteristics and will only pass signals from their inputs of their outputs when control inputs C thereof are supplied with a high or 1 logic signal. Immediately following actuation of switch 104, decade counter 168 is reset, as noted above. As a result, its output 9 signal is low or 0 so that the signal fed over line 206 to the control input of latch gate 152 causes the gate to remain closed.

With the shift/code flip-flop 170 in a set condition, its Q output goes to 1 and its $\overline{Q}$ output remains 0. This places a 1 or high signal on the control input of shift gate 162 so as to allow the output of the tone 2 generator 156 to pass over line 208 to the modulator-transmitter 210 for transmission to the receiver. Since the $\overline{Q}$ output of shift/code flip-flop 170 is at a low level, the cathodes of diodes 172 and 174 are grounded causing the control inputs of data gate 160 and code gate 164 to be held at a 0 level. Thus, of the four gates connected so as to supply signals over line 208 to the transmitter, namely data gate 160, shift gate 162, code gate 164, and latch gate 152, only the shift gate 162 will be opened immediately following actuation of switch 104. This is shown diagrammtically in Row A of FIG. 5 which indicates that tone 2 is being transmitted during the interval of time following time $t_0$ and prior to time $t_1$.

As described above, the sequence clock 190 of the transmitter receives an input signal from a chosen one of the various tone generators. Assuming that the output of tone 1 generator 154 is connected to input CA of clock 190 and further assuming that the clock 190 is a divide-by-50 divider, the intervals of time between points $t_1$, $t_2$, $t_3$, etc. will be established by the counting of 50 cycles of the tone 1 generator signal. Thus, the initial condition described above, wherein the tone 2 generator signal is fed to the transmitter 210, will continue until time $t_1$ after tone 1 generator 154 has run through 50 cycles. It is preferred that the tone generator having the lowest frequency output be selected for supplying the input signal to clock 190 since the tone demodulators in the receiver require at least 20 cycles to stabilize under worst case conditions. Selection of 50 cycles of the lowest frequency tone therefore allows adequate time for stability to be reached within the receiver section so as to prevent false triggering or improper sequencing.

When clock 190 has counted 50 cycles of its input signal, its output will go to a low or 0 state which, after inversion by inverter 188, provides a high or 1 signal to the clock input C of shift/code flip-flop 170. This positive-going signal causes the flip-flop 170 to change state such that the Q output thereof goes to a low or 0 level. Correspondingly, the $\overline{Q}$ output of flip-flop 170 goes to a high or 1 state whereby both diodes 172 and 174 become back-biased.

At this point in time, the decade counter 168 is still in its initial condition following reset such that its 0 output has a high or 1 logic level signal. Since diode 172 is back-biased, this signal is allowed to be applied through resistor 166 to the control input of data gate 160. As a result, the output of tone 1 generator 154 is then fed to line 208 and transmitter 210 for transmission to the receiver. Since the Q output of shift/code flip-flop 170 is now at a low or 0 level, the shift gate 162 closes blocking the tone 2 generator signal from applied to the transmitter. Both code gate 164 and latch gate 152 remain blocked at this time since their control inputs still do not have a high or 1 input.

Referring again to FIG. 5, during th period between $t_1$ and $t_2$ the transmitter is transmitting the tone 1 signal rather than the tone 2 signal provided during the initial period. Row C of FIG. 5 is a graph plotting frequency versus time and showing the unmodulated signal applied on line 208 to the transmitter 210. As illustrated, during the first period, the signal on line 208 is at athe frequency of tone 2 and at time $t_1$ changes to the frequency of tone 1.

Referring to FIG. 3, incoming signals detected by receiver 510 are demodulated to extract the information from the radio carrier and are applied over line 512 to the phase locked loop frequency-to-voltage converter 514. The signals on line 512 are therefore substantially identical to the signals on line 208 of the transmitter of FIG. 2. As described above, the converter 514 cooperates with network 516, network 520, voltage follower 522 and network 524 to develop and apply a signal having a voltage level corresponding to the frequency of the incoming tone. This incoming "tone proportional" signal is fed to the inputs of each of the demodulators 526 through 534 so as to produce high or low output signals depending upon the presence or absence of each particular tone.

At time $t_1$, when the transmitter begins transmitting the tone 1 signal the output of tone 1 demodulator 526 supplied an input signal through network 536 to the data one-shot 540. This causes the one-shot 540 to provide a high or 1 level at its Q output. This signal is fed over line 544 to one input of data gate 548 thereby opening the gate for the subsequent passage of signals on line 546 from the tone 3 demodulator 530.

The data gate one-shot 540 times out in approximately four or five periods of the transmission sequence and thus must be periodically reset or retriggered if the data 548 is to remain open. As a precautionary measure to prevent false triggering, if the data one-shot 540 should for any reason time out, a high or 1 signal will appear at is $\overline{Q}$ output. This signal will be applied through diode 556 to the clear input of shift register 552 causing the same to be reset. In this manner, shift register 552 will be precluded from storing a partial code word during an aborted transmission sequence for possible subsequent completion and false actuation of the latching network 582.

The output of the tone 1 demodulator 526 is also applied through diode 558 to the clear input of shift register 552 such that the shift register is cleared at the beginning of each transmission sequence. Thus, and referring to FIG. 5, during th interval between $t_1$ and time $t_2$, the transmitter transmits the tone 1 signal and the receiver by causing the data gate 548 to open and the shift register 552 to be reset.

Referring again to the transmitter of FIG. 2, at time $t_2$ clock 190 provides an output signal which is again applied through inverter 188 to the clock input of shift/code flip-flop 170. The flip-flop again changes state such tht the $\overline{Q}$ output goes low and the Q output goes high. Diodes 172 and 174 thus effectively ground the control inputs of gates 160 and 164 preventing tone 1 or tone 3 signals from being transmitted. With the Q output of shift/code flip-flop 170 high, however, the shift gate 162 is again opened to feed a tone 2 signal to line 208 for transmission. This is shown in Row A of FIG. 5 indicating that tone 2 is being transmitted after time $t_2$. The positive-going signal caused by the Q output of the shift/code flip-flop 170 going from a low to a high level is also applied via lines 184 and 186 to the clock input of decade counter 168 causing the 0 output thereof to go to a low level and the 1 output thereof to go high.

Referring again to the receiver of FIG. 3, receipt of the tone 2 signal causes tone 2 demodulator 528 to provide an output signal which is applied through network 538 to the shift one-shot 542. The shift one-shot is thereby tripped or triggered so as to start timing. Its timing is adjusted to approximately one and one-half periods of the transmission sequence so that an appropriate shift signal will be applied to the shift register 552 during approximately the middle of the next period when the incoming data signal has stabilized. Because of the connection by line 560 of the $\overline{Q}$ output of one-shot 542 with the positive-going or A input of data gate one-shot 540, each time the shift one-shot 542 times out, the data one-shot 540 will be retriggered or reset. In this manner, as each bit of incoming code is received, and the shift register is shifted, the data gate one-shot 540 is reset. If for some reason, transmission of the entire sequence is prevented, the data gate one-shot 540 will not be retriggered and after four or five periods of the transmission sequence, will time out causing the shift register 552 to be reset and blocking all further data input. This interlock between the shift and data gate one-shots functions to preclude virtually all false signals from causing actuation of the output device of the associated receiver.

In FIG. 5, following time $t_2$, it can be seen that the transmitter is transmitting a tone 2 signal which causes the receiver to trip the shift one-shot 542. The one-shot 542 times out during approximately the middle of the next transmission period to cause the shift register 552 to shift and load the incoming data signal appearing at its data input.

Turning once again to the transmitter, at time $t_3$, clock 190 causes the shift/code flip-flop 170 to change state causing the shift gate 162 to again become closed and back-biasing diodes 172 and 174, as before. Since the decade counter 168 was previously shifted by the positive-going signal on line 186 at time $t_2$, its 0 output is at a low level causing data gate 160 to remain blocked. The 1 output, however, of decade counter 168 is now at a high or 1 level. Since the terminal 180 corresponding to the 1 output of decade counter 168 is not connected to the common terminal 182, the control input of code gate 164 receives a low or 0 level signal so as to remain blocked. The tone 3 generator signal thus does not pass to line 208. Since this corresponds to the first bit of the eight bit code word programmed by the interconnection of terminals 180 and 182, FIG. 5 illustrates that the transmitter is transmitting a tone 3 signal, the superscript designating the particular bit in the eight bit coded word, between time $t_3$ and time $t_4$. In reality, no signal whatsoever is being transmitted since the output of the tone 3 generator is blocked by the closed code gate 164. Nevertheless, and for simplicity, this is considered as a tone 3 0 output.

At the receiver, the output of the tone 3 demodulator 530 will provide a signal over line 546 to the data gate 548. Since the data gate 548 was previously opened and remains opened by the data gate one-shot 540, the signal on line 546 will pass through to the data input of shift register 552 for storage in the first data bit position. Since the transmitted tone 3 signal was a 0, actually provided by the absence of a tone 3 generator output, a 0 signal will appear on line 546 and the data input D of shift register 552.

The transmitter will continue to sequence in the above described manner between tone 2 signals from generator 156 and tone 3 signals from generator 158 as the shift/code flip-flop 170 continues to change states. As the decade counter advances, those particular output terminals 180 which are connected to terminal 182 will cause the code gate 164 to pass tone 3 generator signals to line 208 for transmission. These correspond to 1 bits in the eight bit binary code word, while the unconnected outputs of the decade counter corrsponds to the 0 bits. In the example shown in FIG. 2, the decade counter 168 is programmed to transmit the binary word 00011010.

As shown in FIG. 5, from time $t_2$ through time $t_{19}$ the alternating sequence between the tones 2 and 3 generators will advance so as to cause the eight individual bits of code word to be sequentially transmitted. At the receiver, the outputs of tone demodulators 528 and 530 corresponding to tones 2 and 3, will likewise alternatively be produced. This causes the shift register 552 to to alternately shift and load the eight individual bits as they are received.

Therefore, at time $t_{19}$, the shift registers 552 of each of the receivers in the network will have stored a particular eight bit binary word corresponding to the transmitted eight bit code word from the transmitter. Also, the code selectors 574 in each of the receivers will have already been preset to individual eight bit code words corresponding to those codes previously authorized. In this example, the code selector 574 is preset to the binary word 00011010, and will result in comparator 572 providing a true or 1 signal on output line 576. This signal will enable both gates 578 and 580 such that the outputs of tone 4 demodulator 532 and tone 5 demodulator 532 will pass to the on and off inputs, respectively, of latching circuit 582.

Referring back once again to the transmitter of FIG. 2, the particular transmission sequence which has been discussed was initiated by actuation of swich 104. Since this caused the latch mode flip-flop 138 to assume a reset condition, gate 140 allowed the tone 4 generator 144 to pass to the input of latch gate 152. At time $t_{19}$, the decade counter 168 will have advanced so that a true or 1 signal appears only at its 9 output. Accordingly, a signal is applied on line 206 to the control input of latch gate 152 causing the transmission of the tone 4 generator signal which has passed through gate 140.

This signal is received by the receiver and causes an output signal to be provided by the tone 4 demodulator 532. This output signal passes through the open gate 578 causing latching circuit 582 to turn on. Accordingly, output device 586 is enabled so as to register the appropriate alarm or control function. At the same time, the output of the tone 4 demodulator 532 is fed through diode 566 and inverter 564 to the input of gate 562. Due to the inverter 564, this removes the enabling signal from gate 562 causing the same to close and preclude the subsequent transmission of a shift signal to the shift register 552. In this manner, the shift register will hold its completed 8 bit output so as to maintain the comparator output at a high or 1 level for holding gates 578 and 580 open.

After latching circuit 582 has been actuated, a resetting signal is applied through network 588 and diode 592 to the shift register 552 so as to clear the register and prepare the receiver for a subsequent transmission sequence.

Since the transmitter has thus completed an entire transmission sequence, the high output at terminal 9 of the decade counter 168 will be applied over line 200 and gate 196 to the reset input of on/off flip-flop 116. The flip-flop is thus returned to its reset mode thereby causing the Q output to fall to a low or 0 level. Accordingly, transistor 122 and 126 are turned off to remove operating potential from terminal 130 and, thus, from the various devices within the transmitter. The transmitter is thereby placed once again in a standby mode, ready for the transmission of a subsequent sequence.

If it is desired to turn off the latching circuit 582 and the output device 586 in the receiver of FIG. 3, the identical sequence described above is repeated with the exception that the sequence is initiated by actuation of switch 106. The sequence of events described above will occur in identical fashion except that the latch mode flip-flop 138 will cause gate 140 to block the tone 4 generator while gate 142 allows the tone 5 generator to pass to the latch gate 152. Therefore, at time $t_{19}$, the tone 5 signal will be transmitted rather than the tone 4 signal such that the output of tone 5 demodulator 534 in the receiver will be fed to the off input of latching circuit 582. The circuit is thus turned off and the output device 586 de-activated.

From the foregoing, and from a review of the charts of FIG. 5, it can be appreciated that a complete transmission sequence according to the present invention first involves the transmission of a tone 1 signal to cause the receivers to open their respective data gates an reset the shift registers.

Thereafter, the alternate sequence of tones 2 and 3 will begin and will continue until all eight bits of the preprogrammed code have been transmitted. At the end of the sequence, only that receiver which has been preset by code selector 574 to the exact eight bit code of the transmitted word will provide a true or 1 output from the comparator 572. All of the remaining receivers will provide a false output such that their gates 578 and 580 will be blocked to prevent either the turning on or the turning off of latching circuit 582. In the preset receiver, however, the true output of the comparator will allow the subsequently transmitted tone 4 or tone 5 signal to cause the latching circuit 582 to turn on or off, respectively, for the control of output device 586.

The system according to the present invention may be constructed by using any suitable component parts such as commerically available integrated circuits. Complementary-symmetry metal-oxide semi-conductor devices are particularly well suited for the present invention since they require extremely low power supply currents resulting in very long battery life. Further, they are highly immune to noise and are, therefore, well suited for use in industrial surroundings and in transmitters and receivers where high noise levels and interference may be encountered. Both the transmitter and receiver sections may be made extremely small using state of the art integrated circuit technology such that either or both units may be portable, as needed.

Figure 6:
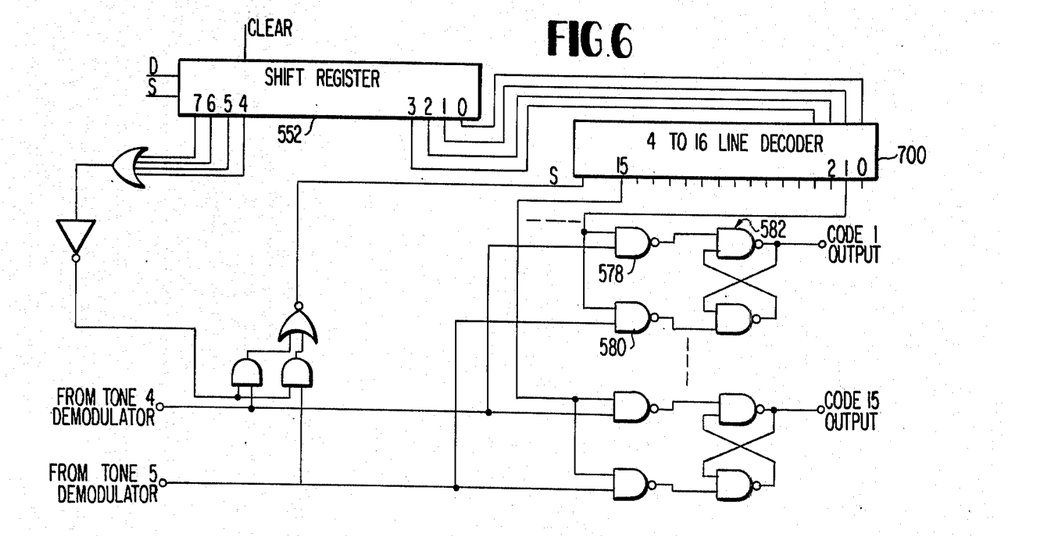
FIG. 6 is a block diagram of a modification of the code storage and latching assembly of the receiver circuit of FIG. 3.

In the foregoing example, the system has been described for control by each receiver of an output device in the nature of an alarm or warning. Of course, each receiver can be connected to control any appropriate output device such as a burglar or intrusion system or any other assembly normally controlled by on and off signals. The present invention may also be modified in order to control a number of different devices at a single receiver. Referring to FIG. 6, such a modified circuit is shown for substitution in the network of FIG. 3 in place of shift register 552, comparator 572, code selector 574, gates 578 and 580, latching circuit 582, and output device 586.

In the network of FIG. 6, the shift register 552 has its outputs divided into two four bit sets. The first set (bits 7,6,5 and 4) are used to control the strobe input S of a 4 - to - 16 line decoder 700. The decoder receivers the second four bit word as an input from the shift register 552 and converts this binary number into a decimal number so as to cause one of the outputs 1 to 15 to be provided with a high or true signal. Each output of the decoder 700 is connected to one input of a pair or gates corresponding to gates 578 and 580 in the circuit of FIG. 3. The gates 578 and 580 likewise are connected to the two inputs of a latching network 582 so as to turn the particular output device on or off in accordance with the presence of either, a tone 4 or a tone 5 signal. Therefore, depending upon the particular binary word in the last four bits of the transmitted data, one of fifteen output devices can be controlled and can be turned on or off at each receiver.

It should also be noted that although the circuits are preferably complementary-symmetry metal-oxide sameconductor devices, any other family of devices, such as resistor transistor logic (RTL), diode transistor logic (DTL), transistor logic (TTL) or discrete transistor devices may be utilized. Furthermore, the various device equivalents may be custom integrated together into a single device package.

It can be appreciated from the foregoing description, that the present invention is capable of operating quickly and simply to provide selective signaling and control of any of various output devices in an error free manner. Because of the nature of the transmission sequence according to this invention, false triggering is virtually impossible. Furthermore, by using an eight bit word, 255 discrete code combinations are possible, and by interchanging the tones of the five tone generators, this number is increased to well over 15,000. It should also be kept in mind that these 15,000 combinations represent only the number of codes which can be transmitted over a single channel or on a single carrier frequency. By using two, three or four different frequency signals, the number of combinations is multiplied even further so that tremendous flexibility is provided in assuring selective control of a particular one or ones of various receivers out of a tremedously large number. Notwithstanding the advantage of extreme selectively and the large number of discrete codes, the system remains extremely simple and is capable of solid state construction in an extremely small package with very low power input requirements.

Inasmuch as the present invention is subject to many variations, modifications and changes in detail, it is intended that all matter contained in the foregoing description or shown in the accompanying drawings shall be interpreted as illustrative and not in a limiting sense.

What is claimed is:

1. A selective signaling and control system comprising a transmitting circuit including a first network for generating a start and reset signal at a first frequency, a second network for generating a shift and code word comprising a plurality of alternate second and third frequency tones representing shift and code bit signals, respectively, and a third network for generating a latch control signal at a frequency differing from said first, second and third frequencies; and a receiving circuit including first means responsive to said start and reset signal for assuming a data receive mode, second means responsive to said alternate shift and data bit signals to store said data bit signals to sequence, means comparing said stored data bit signals with a preselected code and generating an output when the two are equal, and a network enabled by the output of the comprising means to respond to said latch control signal for activating an output device.

2. The invention as recited in claim 1 wherein said output device comprises means for audio communication having a normally quiescent state and responsive to said latch control signal for assuming an active state to enable audio communication.

3. A selective signaling and control system comprising first means for generating a start and reset signal at a first frequency; second means for generating a preselected code signal comprising a plurality of alternating tones at second and third frequencies; third means for generating an on/off latching signal at a frequency differing from said first, second and third frequencies; and fourth means coupled with said first, second, and third means for sequentially controlling the same to generate a composite coded message; wherein said second generating means comprises a pair of different frequency tone generators and shift means alternately enabling each of said tone generators; said shift means comprising a clock network, a shift/code flip-flop having a trigger input connected to an output of said clock network for periodically changing states in response to said clock output, and gate means coupled with the output of said shift/code flip-flop and said tone generators to alternatively enable the same; said gate means comprising a first gate controlling the output of a first one of said tone generators and a second gate controlling the output of a second one of said tone generators, said first and second gates being responsive to said shift/code flip-flop; and a decade counter coupled with said shift/code flip-flop and said second gate through a patching network for controlling said second gate in accordance with a preprogrammed code.

4. The invention as recited in claim 3 wherein said third means comprises third and fourth tone generators, and means coupled to said generators for selectively enabling one of said third and fourth tone generators, said selective enabling means comprising a latch mode flip-flop having a pair of output terminals connected to one input of a pair of latch control gates, respectively, each of said latch control gates having a second input connected to receive a respective output of said third and fourth tone generators.

5. In a selective signaling and control system, a transmitting circuit comprising
a signal output network;
first means for generating a start and reset signal at a first frequency;
second means for generating a signal at a second frequency;
third means for generating a code bit signal at a third frequency;
first, second, and third gate means connected to said first, second and third generating means, respectively, for coupling the outputs thereof to an input of said signal output network,
a programmable decade counter coupled at an output to said first and third gate means for opening and closing said first and third gate means in a preselected sequence thereby to control the presence and absence, respectively, of said first and third frequency tones at the input of said signal output network; and
clock controlled switching means coupled to said first, second and third gate means and said decade counter for alternatively enabling and disabling said second gate means and said decade counter whereby the signal fed to said signal output network consists of a series of tone bursts comprising said second frequency tone alternate with a first or third frequency tone as enabled by said decade counter.

6. In a selective signaling and control system, a receiving circuit comprising first means responsive to a start and reset signal at a first frequency for providing a sequence start signal;

second means coupled to said first means and responsive to a series of alternating tones at second and third frequencies, respectively, when said sequence start signal is provided, for storing each of said received third frequency tone signals as a separate data bit at a serial position sequentially advance by each received second frequency tone signal;

means comparing said stored data bit signals with a preselected code and generating an output when the two are equal; and control means enabled in response to the output of said comparing means to respond to a tone signal at a fourth frequency to contol an output device.

7. The invention as recited in claim 6 wherein said second means comprises a shift register, and wherein said comparing means comprises a preset code selector and a binary comparator connected to receive and compare output signals from said shift register and said preset code selector.

8. The invention as recited in claim 6 further including input means coupling said tone signals to said first and second means, said input means comprising a phase locked loop frequency to voltage converter; and wherein said first and second means comprise voltage comparators each having a filtering network and a pair of differential amplifiers.

* * * * *

UNITED STATES PATENT AND TRADEMARK OFFICE
CERTIFICATE OF CORRECTION

PATENT NO. : 4,001,772
DATED : January 4, 1977
INVENTOR(S) : TRUMAN W. POWELL ET AL It is certified that error appears in the above-identified patent and that said Letters Patent are hereby corrected as shown below:

In the drawings, sheet 1, Fig. 4, the bottom terminal of the capacitor of network 600 should be connected to ground only; resistors 608 and 610 should not be connected to the capacitor of network 600 but should be directly connected together with the junction thereof connected to the negative input of differential amplifier 604;

In the drawings, sheet 3, Fig. 3, the gate which has its output connected to input S of shift register 552 should be identified by the reference number -- 570 --; and the reference number identifying the output device should be changed from "580" to -- 586 --.

Signed and Sealed this

Eighth Day of November 1977

[SEAL]

Attest:

RUTH C. MASON
*Attesting Officer*

LUTRELLE F. PARKER
*Acting Commissioner of Patents and Trademarks*